United States Patent [19]

Tanaka et al.

[11] Patent Number: 4,829,328
[45] Date of Patent: May 9, 1989

[54] CAMERA

[75] Inventors: Yasuhiko Tanaka; Fumio Iwai; Hideo Kobayashi, all of Omiya; Hiroshi Komatsuzaki, Tokyo, all of Japan

[73] Assignee: Fuji Photo Film Co., Ltd., Kanagawa, Japan

[21] Appl. No.: 180,825

[22] Filed: Apr. 12, 1988

[30] Foreign Application Priority Data

Apr. 15, 1987 [JP] Japan .................................. 62-92864
Apr. 15, 1987 [JP] Japan .................................. 62-92865

[51] Int. Cl.$^4$ ................................................ G03B 1/18
[52] U.S. Cl. .................................. 354/173.1; 354/214
[58] Field of Search ................ 354/173.1, 204, 206, 354/212, 213, 214, 215, 400

[56] References Cited

U.S. PATENT DOCUMENTS 4,601,563 7/1986 Miyawaki et al. ........... 354/173.1 X
4,610,522 9/1986 Tobioka et al. ................ 354/214 X
4,619,510 10/1986 Nakanishi .................... 354/173.1

Primary Examiner—L. T. Hix
Assistant Examiner—Brian W. Brown
Attorney, Agent, or Firm—Young & Thompson

[57] ABSTRACT

A camera of a preliminary winding type in which a film in a patrone is previously taken out from the patrone to roll it round a spool and, each time one frame photographing is completed, the film is rewound into the patrone by one frame in photographing. The camera comprises a motor, a preliminary winding mechanism, a frame-by-frame rewinding mechanism, a focal length varying mechanism, first and second planetary clutch mechanisms, and an engagement mechanism for locking the first planetary clutch mechanism, and is capable of switching the power transmission to the preliminary winding, frame-by-frame rewinding and focal length varying mechanisms by changing the direction of rotation of the motor.

7 Claims, 8 Drawing Sheets

CAMERA

BACKGROUND OF THE INVENTION

1. Field of the Invention

The present invention relates to a camera of a preliminary winding type in which a film stored in a patrone is previously taken out from the patrone and rolled round a spool and the film is rolled back frame by frame from the spool for photographing.

2. Description of the Related Art

Recently, electric motorization has been progressed in a camera. For example, frame-by-frame film advancing in photographing, film rewinding after completion of photographing, adjustments of focal distances and the like have been motor-operated. However, in a camera of an ordinary winding type which has a focal length varying mechanism such as a zoom mechanism, a tele-wide switching mechanism and the like, if an exclusive motor for adjusting focal distances in an electric powered manner, besides a motor for frame-by-frame advancing/film rewinding, is provided in the camera, then the camera becomes inconveniently larger in size.

Also, when the frame-by-frame advancing mechanism, film rewinding mechanism and focal distance varying mechanism are driven by a single motor, a three-way switchable clutch device is necessary which is complicated in mechanism.

Conventionally, in the field of the camera of an ordinary winding type, there is proposed a camera (Japanese Utility Model Kokkai (Laid-open) No. 60-110835 in which first clutch for switching a frame-by-frame film advancing mechanism and a film rewinding mechanism and a second clutch for switching a film rewinding mechanism and a focal distance varying mechanism are employed and the frame-by-frame advancing mechanism, film rewinding mechanism and focal distance varying mechanism can be switched selectively by the two clutches. In this camera, at first the first clutch is switched to the frame-by-frame mechanism to advance a film by one frame, next the first clutch is switched from the frame-by-frame advancing mechanism over to the film rewinding mechanism and the second clutch is switched over to the focal distance varying mechanism for driving lens, and, after a shutter is released, the first clutch is again switched over to the frame-by-frame mechanism. After then, these operations are repeated until all frames of the film are photographed. After completion of photographing, the first clutch is switched over to the rewinding mechanism and the second clutch is changed over to the rewinding mechanism so that the film can be rewound.

However, the above-mentioned camera of an ordinary winding type is disadvantgeous in that it requires an external operation member for switching the second clutchand that it requires a complicated switching mechanism between the external operation member and itself.

On the other hand, there has been proposed a camera of a preliminary winding type in which the whole length of a film stored in a patrone is previously reeled around a spool, each time the photographing of each frame is completed the film is rewound into a patrone to feed the frame, and this operation is repeated until the whole length of the film is photographed.

The camera of the above-mentioned preliminary winding type comprises a preliminary winding mechanism which previously draws out a film stored in a patrone therefrom and rolls the film around a spool, and a frame-by-frame film rewinding mechanism for rewinding the film frame by frame from the spool into the patrone, wherein rotational forces from a motor can be selectively transmitted to the preliminary winding mechanism or the frame-by-frame film rewounding mechanism through a clutch mechanism using a planetary gear so that the two mechanisms can be driven by a single motor.

In other words, in the above-mentioned camera, at first the clutch mechanism is connected to the preliminary winding mechanism to take out the whole length of the film from the patrone and roll it round the spool, and then the motor is rotated in a reverse direction to automatically switch the clutch mechanism over to the frame-by-frame film rewinding mechanism so that the film can be rewound frame by frame into the patrone for photographing.

SUMMARY OF THE INVENTION

In view of the fact that, if a camera of a preliminary winding type is employed, preliminary winding, frame-by-frame winding and focal length adjustment can be achieved by simple mechanisms, the present invention has as an object the provision of a camera which is capable of switching simply the rotational forces of a motor over to any of a preliminary winding mechanism, a frame-by-frame film rewinding mechanism and a focal length varying mechanism only by changing the rotational direction of the motor without using a complicated switching mechanism.

In order to attain the above object, according to one aspect of the invention, there is provided a camera which comprises a rotary drive source, a preliminary winding mechanism for drawing out a film stored in a patrone therefrom to roll the film round a spool, a frame-by-frame film rewinding mechanism, a focal length varying mechanism for advancing or retreating a photographing lens barrel to vary focal length, a power transmission mechanism for transmitting the rotational forces from the rotary drive source to the frame-by-frame rewinding mechanism or the focal length varying mechanism, a first clutch mechanism connectable selectively to the preliminary winding mechanism or the input side of the power transmission mechanism to transmit the rotational forces of the rotary drive source to the preliminary winding mechanism or the power transmission mechanism, a second clutch mechanism connectable to the output side of the power transmission mechanism and selectively connectable to the focal length varying mechanism or the frame-by-frame film rewinding mechanism to transmit the rotational forces of the rotary drive source to the focal length varying mechanism or the frame-by-frame film rewinding mechanism, an engagement member for engaging the first clutch mechanism so that the first clutch mechanism can be connected with the power transmission mechanism, and an engagement removing member operable cooperatively with opening and closing of a back cover of the camera to remove the engagement of the engagement member.

Also, in achieving the above object, according to another aspect of the invention, there is provided a camera which comprises a rotary drive source, a preliminary winding mechanism for previously taking out a film stored in a patrone therefrom to roll the film round a spool, a frame-by-frame film rewinding mechanism for rewinding the film frame by frame from the spool into the patrone, a focal length varying mechanism for advancing or retreating a photographing lens barrel to vary focal length, a switching mechanism operable externally to switch the focal length varying mechanism so that the lens barrel can be driven selectively to the advancing or retreating sides thereof, a power transmission mechanism for transmitting the rotational forces from the rotary drive source to the frame-by-frame rewinding mechanism or the switching mechanism for the focal length varying mechanism, a first clutch mechanism connectable selectively to the preliminary winding mechanism or the input side of the power transmission mechanism to transmit the rotational forces of the rotary drive source to the preliminary winding mechanism or the power transmission mechanism, a second clutch mechanism connectable to the output side of the power transmission mechanism and selectively connectable to the switching mechanism for the focal length varying mechanism or the frame-by-frame film rewinding mechanism to transmit the rotational forces of the rotary drive source to the switching mechanism for the focal length varying mechanism or the frame-by-frame film rewinding mechanism, an engagement member for engaging the first clutch mechanism so that the first clutch mechanism can be connected with the power transmission mechanism, and an engagement removing member operable cooperatively with the opening and closing of a back cover of the camera to remove the engagement of the engagement member.

Accordingly, according to the invention, due to the fact that the preliminary winding mechanism, frame-by-frame film rewinding mechanism and focal length varying mechanism can be switched simply by changing the rotational direction of a single motor, there are eliminated the need for an exclusive motor for the focal length varying mechanism, the need for an externally operable member used for switching the frame-by-frame rewinding mechanism and the focal length varying mechanism, and the need for a complicated connecting mechanism for connecting the clutch mechanism with the above-mentioned externally operable member.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a camera according to the present invention with reference to the accompanying drawings.

Figure 1:
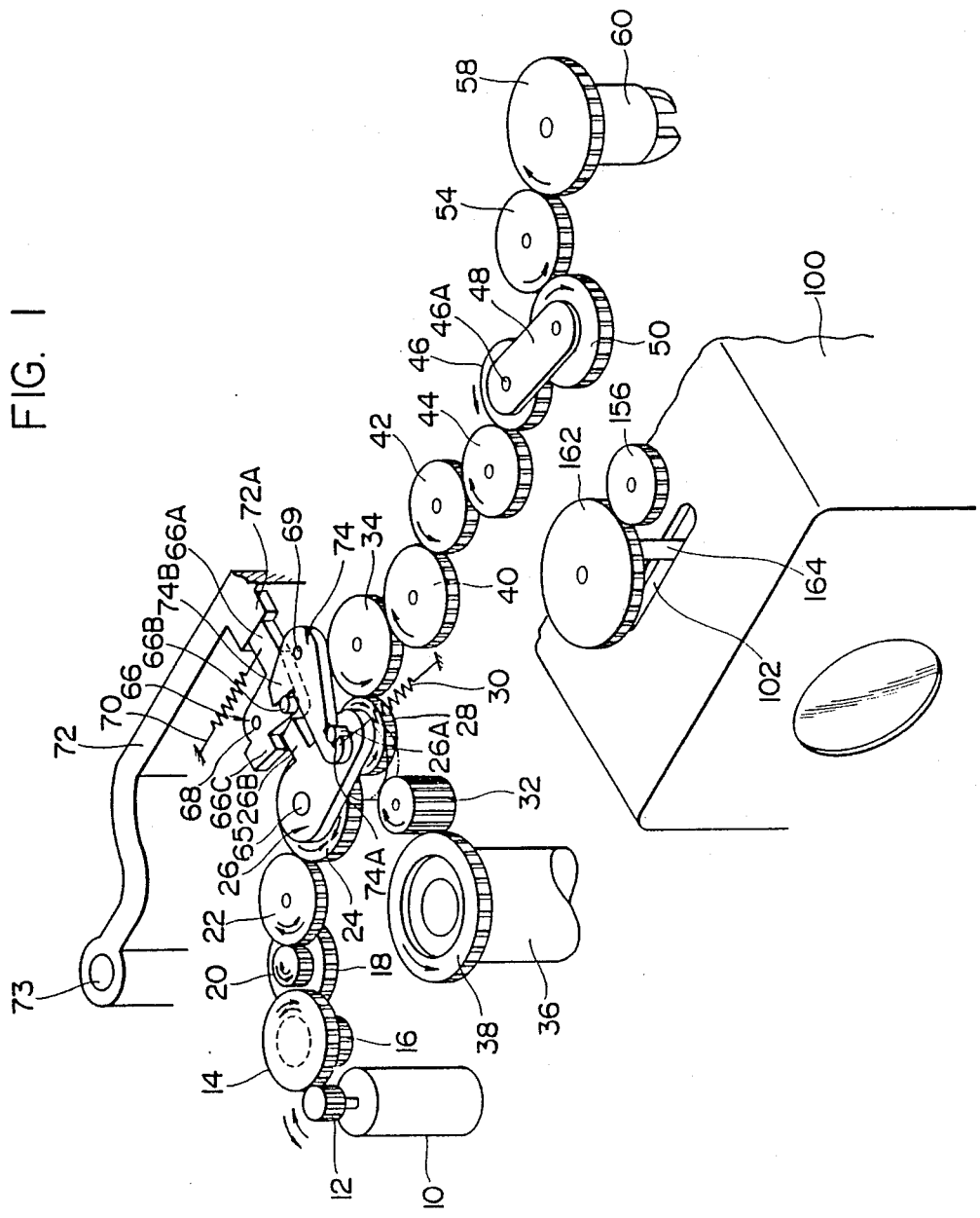
FIGS. 1 and 2 are respectively perspective views to show the structure of gearings employed in a first embodiment of a camera constructed according to the invention.

Referring first to FIG. 1, a motor 10 has an output gear 12 which is connected through gears 14, 16, 18, 20, 22 to a sun gear 24. The sun gear 24 intermeshes with a planetary gear 28 which is pivotally supported by an arm 26 and the arm 26 is in turn supported pivotally by the central shaft 65 of the sun gear 24. The planetary gear 28 is intermeshable with a gear 32 in a film preliminary winding mechanism or with a gear 34 in a transmission mechanism. The preliminary winding mechanism gear 32 intermeshes with a gear 38 provided on the upper end of a winding spool 36.

Figure 3:
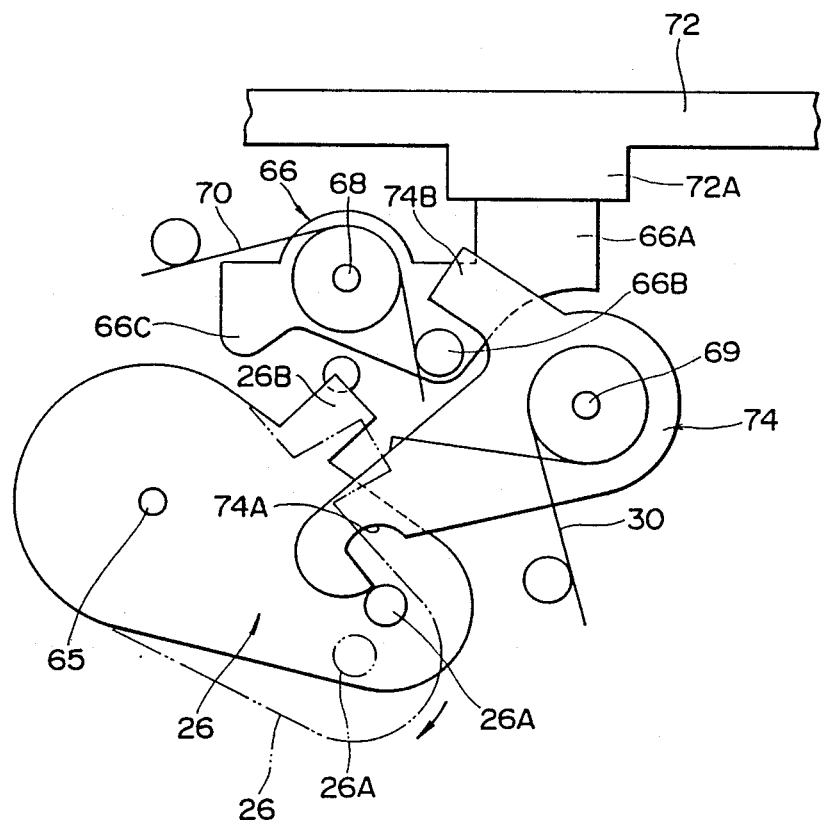
FIGS. 3 through 5 are respectively plan views to show the operations of an engagement mechanism and an engagement removing mechanism.
Figure 4:
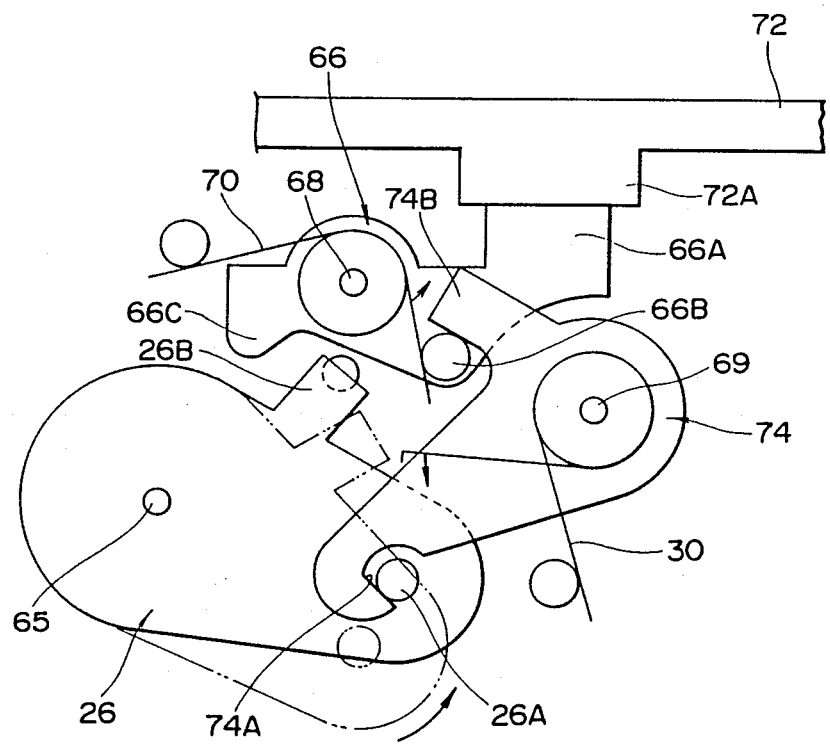
Figure 5:
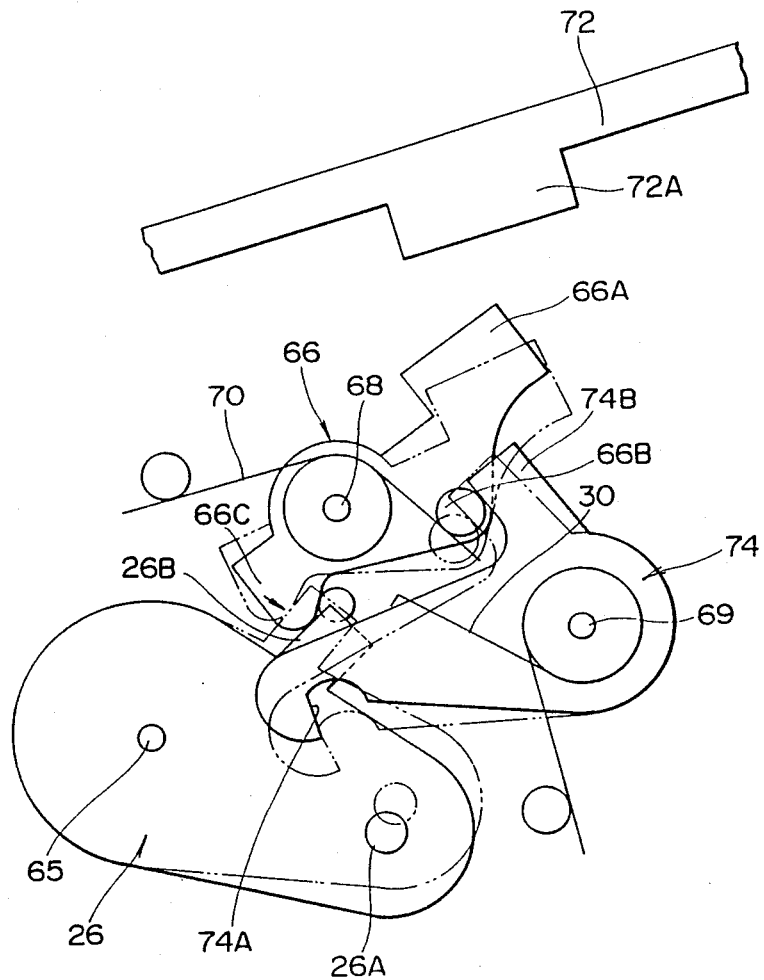

On the other hand, an engagement layer 74, the details of which are shown in FIGS. 3 through 5, is supported by a main body of the camera such that it can be freely rotated about a shaft 69 and is also energized rotationally in a counter-clockwise direction by a spring 30. The engagement lever 74 is formed in the tip end thereof with a recessed portion 74A which is engageable and disengageable with a pin 26A erected on the tip end of the arm 26. Also, an engagement removing lever 66 is supported by the camera main body such that it is free to rotate about a shaft 68 and the lever 66 is rotationally energized counterclockwise by a spring 70. The spring 70 for the removing lever 66 is adapted to be stronger than the spring 30 for the engagement lever 74. The removing lever 66 is provided with a receive portion 66A normally in engagement with a contact portion 72A of a cover 72, a pin 66B normally in engagement with a projection piece 74B of the engagement lever 74, and a projection portion 66C normally in engagement with a projection piece 26B of the arm 26.

When the pin 26A of the arm 26 is not in engagement with the recessed portion 74A of the engagement lever 74, the arm 26 is free from the engagement lever 74 as shown in FIG. 3, and thus, by means of rotation of the gear 12 of the motor 10 in a forward direction, the arm 26 can be rotated in a clockwise direction as shown by a two-dot chained line in FIG. 3 so that the planetary gear 28 provided on the tip end portion of the arm 26 can be intermeshed with the preliminary winding mechanism gear 32 (as shown by a two-dot chained line in FIG. 1). Also, when the gear 12 is rotated in a reverse direction and thus the arm 26 is rotated in a counter-clockwise direction, then the pin 26A of the arm 26 is pressed and rotates the engagement lever 74 in the clockwise direction against the forces of the spring 30 until the pin 26A is brought into engagement with the recessed portion 74A of the engagement lever 74 as shown in FIG. 4. In this state, the arm 26 is locked by the engagement lever 74. Therefore, in this state, even if the output gear 12 of the motor 10 is rotated in the forward direction, since the arm 26 is locked by the engagement lever 74, there is eliminated the possibility that the arm 26 may be rotated in the clockwise direction to disengage the planetary gear 28 out of the transmission mechanism gear 34.

If the back cover 72 is rotated about its shaft of rotation 73 in the counter-clockwise direction in FIG. 1 and is opened, then, as shon in FIG. 5, the contact portion 72A of the back cover 72 is disengaged out of the receive portion 66A of the removing lever 66 so that the removing lever 66 is rotated about the shaft 68 in the counter-clockwise direction by the energizing forces of the spring 70. Since the strength of the spring 70 of the removing lever 66 is greater than that of the spring 30 as described before, if the removing lever 66 is rotated in the counter-clockwise direction, then the pin 66B of the removing lever 66 and the engagement lever 74 with the projection piece 74B thereof in contact with the pin 66B are rotated in the clockwise direction against the energizing forces of the spring 30 so that, as shown in FIG. 5, the pin 26A of the arm 26 is disengaged out of the recessed portion 74A of the engagement lever 74. Further, if the removing lever 66 is rotated in the counter-clockwise direction due to the energizing forces of the spring 70, then the projection portion 66C of the removing lever 66 presses and rotates the projection piece 26B of the arm 26 to forcibly rotate the arm 26 in the clockwise direction, whereby the planetary gear 28 intermeshing with the gear 34 is forcibly disengaged out of the gear 34 and is reset. Thanks to this, even when it is difficult to separate the gear 28 from the gear 34 because the gear 28 bites deeply with the gear 34, the gear 28 can be separated from the gear 34 completely.

Figure 2:
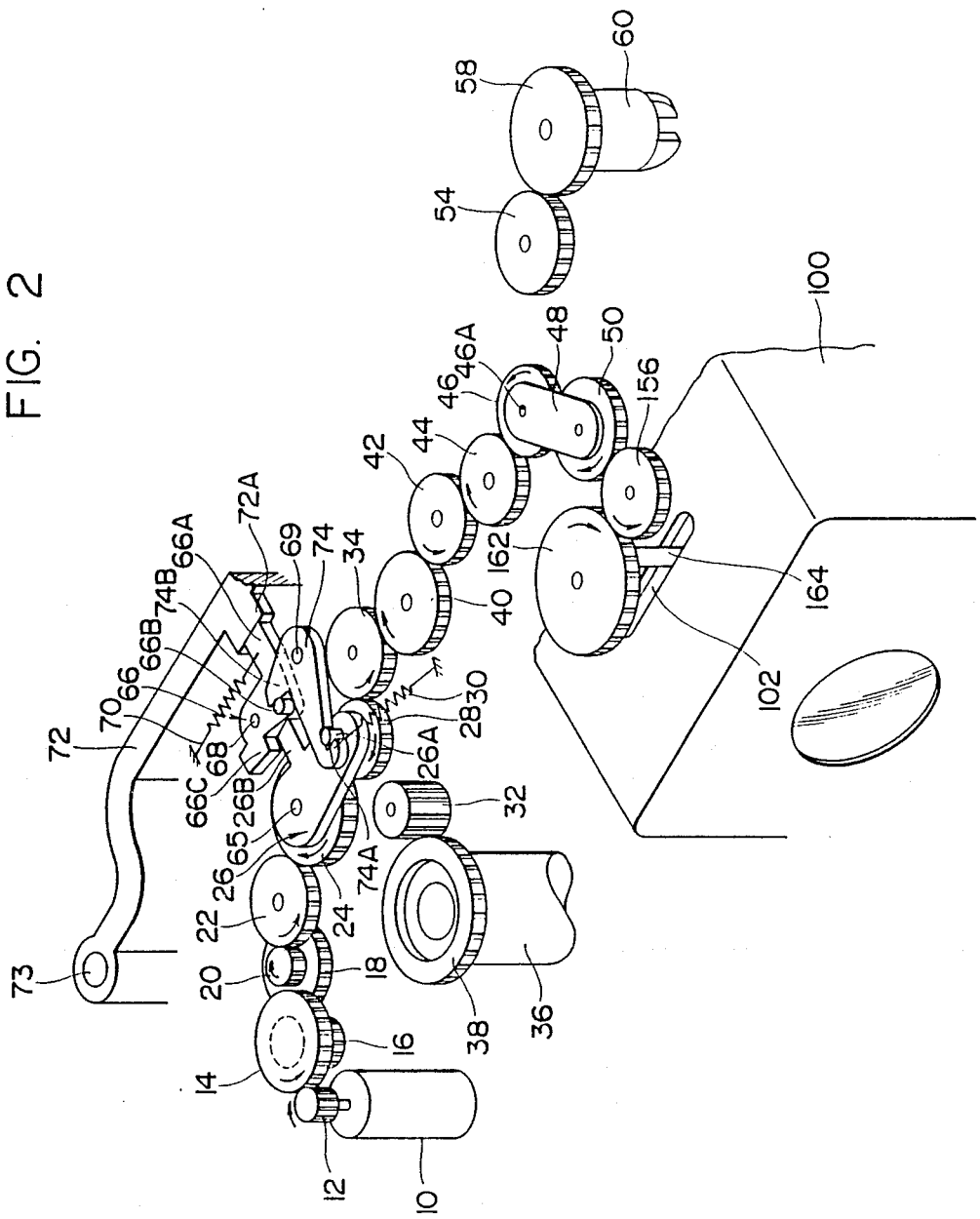

Next, description will be given of a frame-by-frame film rewinding mechanism and a focal length varying mechanism with reference to FIGS. 1 and 2. The transmission mechanism gear 34 is connected through gears 40, 42, 44 with a sun gear 46. The sun gear 46 is in turn intermeshed with a planetary gear 50 which is pivotally supported by an arm 48. And, the arm 48 is pivotally supported by the central shaft 46A of the sun gear 46. The planetary gear 50 is intermeshable with a gear 54 in the frame-by-frame film rewinding mechanism or a gear 156 in the focal length varying mechanism. The gear 54 intermeshes with a gear 58 and the gear 58 has in the lower portion thereof a fork portion 60 which is engageable with a shaft of a film patrone (not shown).

On the other hand, the gear 156 intermeshes with a focal length varying gear 162 and, if the gear 162 is rotated, then a lens barrel 100 is moved by means of an eccentric shaft 164 so that the focal length can be varied. That is, the eccentric shaft 164 is loosely fitted into a groove 102 formed in the lens barrel 100 and thus, in this state, if the gear 162 is rotated, then the lens barrel 100 can be moved.

The embodiment according to the invention that is constructed in the above-mentioned manner can be operated in the following way. While the back cover is closed, the arm 26, engagement lever 74 and removing lever 66 are positioned as shown in FIG. 3. If the gear 12 of the motor 10 is rotated in a forward direction, then the rotational forces of the motor 10 are transmitted through the gears 12, 14, 16, 18, 20, 22, 24 to the planetary gear 28, whereby the arm 26 is rotated in the clockwise direction and thus the planetary gear 28 can be intermeshed with the gear 32 as shown by a two-dot chained line in FIG. 1. As a result of this, the rotational forces of the motor 10 are transmitted to the winding spool 36 which is in turn rotated in a counter-clockwise direction as shown by an arrow in FIG. 1 to thereby take out the whole length of a film (not shown) from the film patrone so as to carry out the preliminary winding of the film.

After completion of the film preliminary winding, the gear 12 of the motor 10 is rotated in the reverse direction, so that the rotational forces of the motor 10 are transmitted through the gear 14, 16, 18, 20, 22, 24 to the planetary gear 28. As a result of this, the arm 26 is rotated in the counter-clockwise direction to intermesh with the gear 34 of the transmission mechanism as shown by a solid line in FIG. 1. In this case, as described before, the pin 26A of the arm 26 is fitted into the recessed portion 74A of the engagement lever 74 so that the arm 26 can be locked there. For this reason, in this state, even if the gear 12 of the motor 10 is rotated in the forward direction, there is eliminated the possibility that the arm 26 may be rotated in the clockwise direction to escape from the gear 34. In this state, if the gear 12 of the motor 10 is rotated in the forward direction, then the rotational forces of the motor 10 are transmitted via the gears 12 through 28 and further via the gears 34 through 44 to the sun gear 46. And, if the gear 12 of the motor 10 is rotated in the reverse direction, then the sun gear 46 rotates the arm 48 in the counter-clockwise direction to thereby intermesh the planetary gear 50 with the gear 54, whereby the fork portion 60 of the gear 58 in engagement with the patrone shaft can be rotated to rewind one of the frames of the film.

After completion of the one frame rewinding, in this state, if the gear 12 of the motor 10 is rotated in the forward direction, the intermeshing between the gears 28 and 34 is maintained because the arm 26 is locked by the engagement lever 74 as described before. The forward rotation of the gear 12 of the motor 10 rotates the arm 48 in the clockwise direction, whereby the planetary gear 50 is disengaged out of the gear 54 and is then intermeshed with the focal length varying mechanism 156 as shown in FIG. 2. With this condition, if the motor 10 is rotated by a predetermined amount in the forward direction, then the gears 156 and 162 are rotated accordingly to move the lens barrel 100 back and forth, so that the focal length can adjusted. After completion of the focal length adjustment, a shutter is released to expose the film.

After then, the gear 12 of the motor 10 is again rotated in the reverse direction, then the rotational forces of the motor 10 are transmitted via the gears 12 through 28 as well as the gears 34 through 44 to the sun gear 46, so that the arm 48 is again rotated in the counter-clockwise direction to intermesh with the gear 54 of the frame-by-frame feeding mechanism. In this state, if the motor 10 is rotated in the forward direction by an amount corresponding to one frame of the film, then the film (not shown) can be rewound by one frame by the fork portion 60 of the gear 58. After then, the above-mentioned photographing operations are repeated in this way. After completion of photographing, the whole length of the film has been rewound into the patrone and, if the cover 72 is opened, as mentioned before, the removing lever 66 is then operated to disengage the arm 26 out of the engagement lever 74 and further to forcibly disengage the planetary gear 28 out of the gear 34 for resetting.

Figure 6:
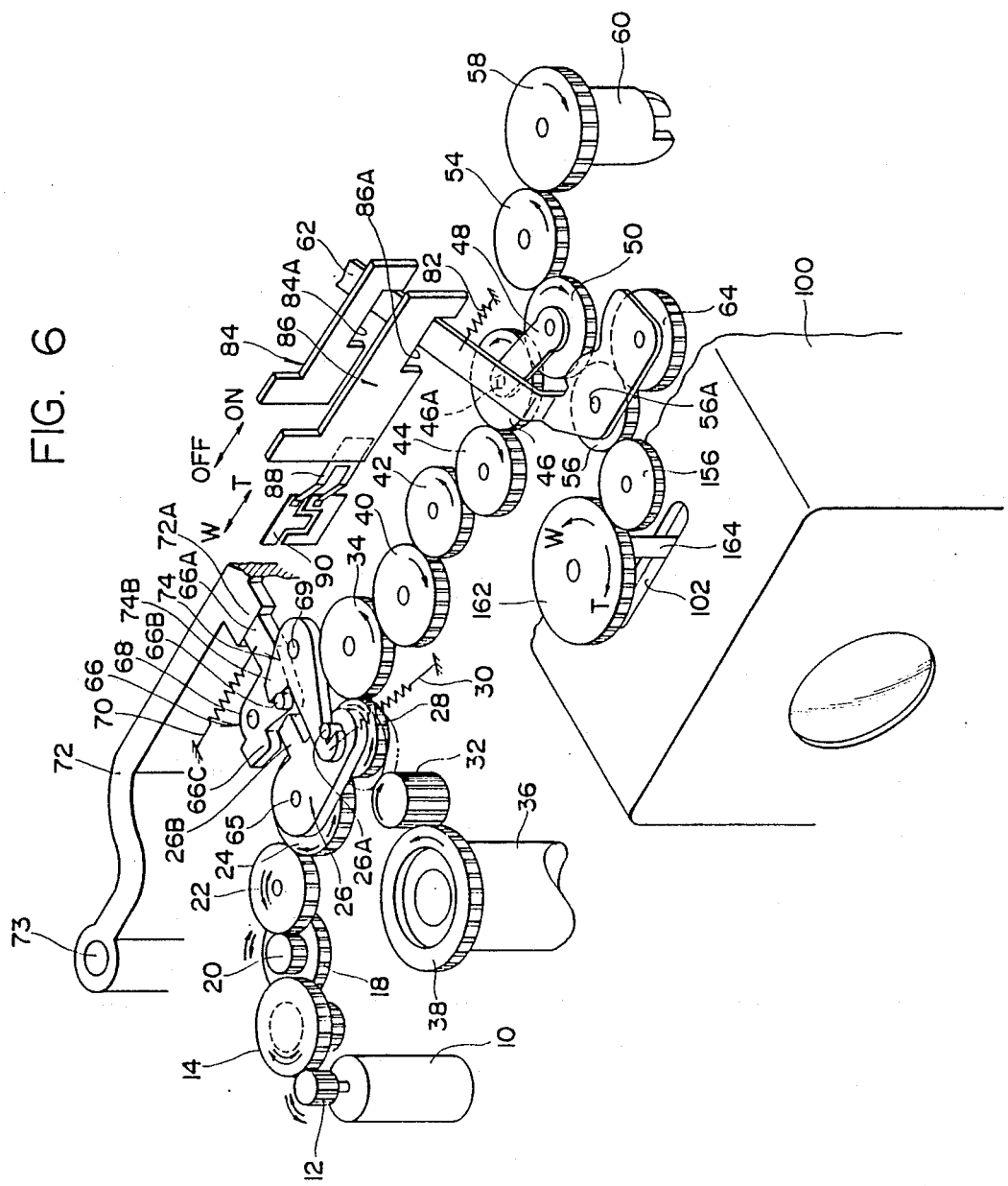
FIGS. 6 through 8 are respectively perspective views to show the structure of gearings employed in a second embodiment of a camera according to the invention: specifically, in FIG. 6, there are shown gears used for preliminary winding and frame-by-frame film rewinding; and, in FIGS. 7 and 8, there are shown gears used for zooming.
Figure 7:
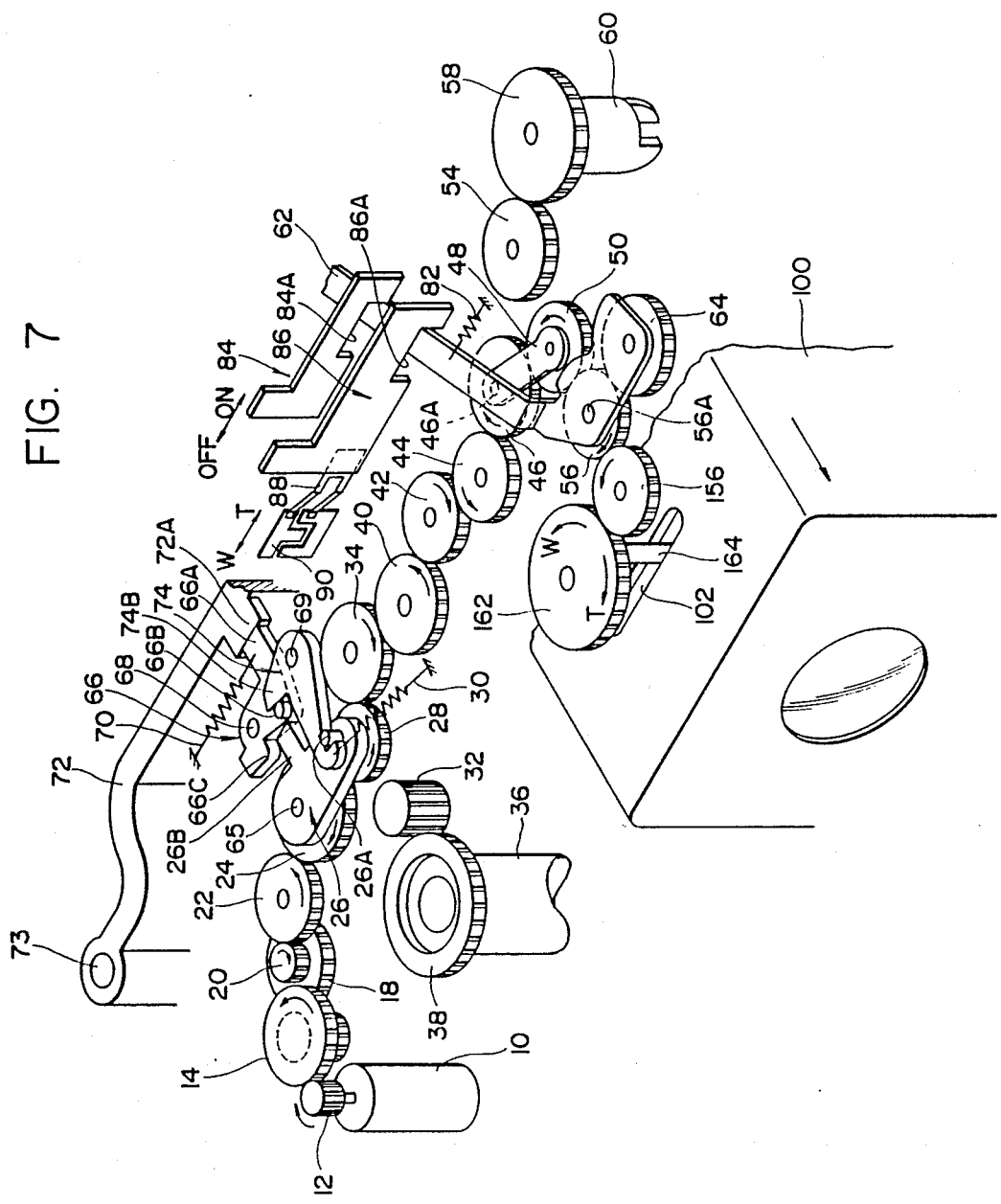
Figure 8:
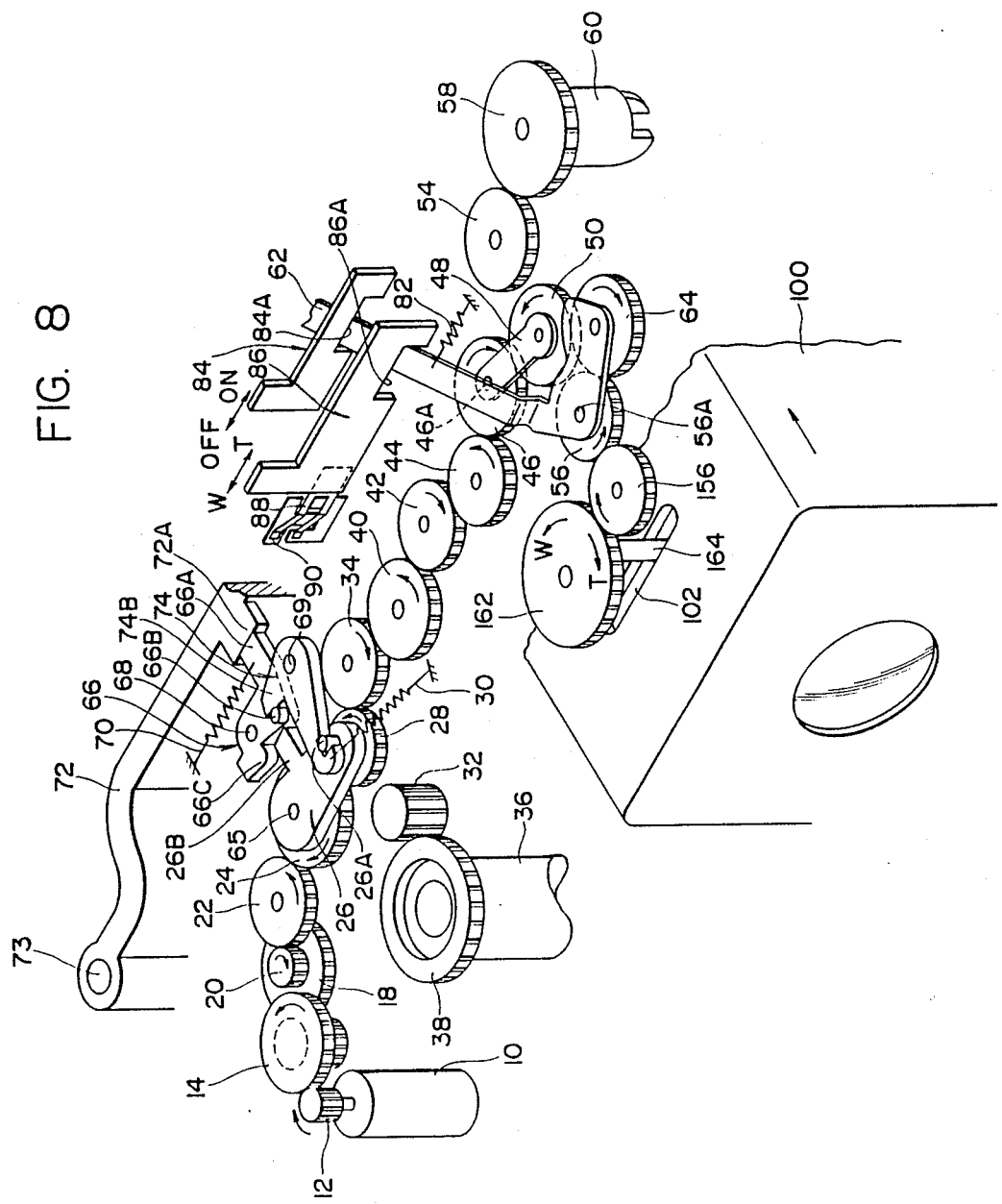

Referring now to FIGS. 6 through 8, there is shown a second embodiment of gears employed in a camera according to the invention. In the second embodiment, the same parts as in the first embodiment shown in FIGS. 1 through 5 are designated by the same reference numbers and the description thereof is omitted here.

In FIG. 6, a planetary gear 50 is intermeshable with a gear 54 of a frame-by-frame rewinding mechanism, a sun gear 56 of a mechanism for switching a focal length varying mechanism, or a planetary gear 64.

On the other hand, a switching lever 62 is supported coaxially with the center of rotation 56A of the sun gear 56 and the switching lever 62 also supports thereon a planetary gear 64 in a pivotal manner which is intermeshable with the sun gear 56. The planetary gear 64 is running idle in a state shown in FIG. 6. When the lever 62 is placed in a position (a tele-position) shown in FIG. 7, then the planetary gear 50 intermeshes with the sun gear 56 and, when the lever 62 is placed in a position (a wide position) shown in FIG. 8, the planetary gear 50 engages with the planetary gear 64. A gear 156 intermeshable with the gear 56 engages with a focal length varying gear 162 and thus, if the gear 162 is rotated, then a lens barrel 100 can be moved back and forth through an eccentric shaft 80 so that the focal length can be varied.

The switching lever 62 is energized by a spring 82 to rotate about the central shaft 56A of the sun gear 56 and at the same time it is in engagement with recessed portions 84A and 86A respectively formed in a main switch lever 84 and a zoom lever 86. When the main switch lever 84 is turned on, it is set in a position shown in FIG. 6, so that the zoom lever 86 can be set in a tele-wide switchable position. When the main switch lever 84 is moved to an OFF position, then the lever 62 is rotated about the shaft 56A in the counter-clockwise direction to occupy a wide position and thus to draw in the lens barrel 100, so that a lens cover (not shown) is closed to automatically store the lens barrel 100. The zoom lever 86 is provided in the left end with a movable contact piece 88 which is in turn in contact with a fixed contact piece 90 in a freely slidable manner. When placed in the left end position (wide position) of the fixed contact piece 90 or in the right end position (wide position) of the fixed contact piece 90, the movable contact piece 88 moves the lens barrel 100, and when interposed between the right and left end positions, the movable contact piece 88 turns off to stop the movement of the lens barrel 100.

In the second embodiment according to the invention constructed in the above-mentioned manner, the film preliminary winding operation and the frame-by-frame film rewinding operation can be performed similarly as in the first embodiment.

After completion of the one frame rewinding, in this state, even when the gear 12 of the motor 10 is rotated in the forward direction, the engagement between the gear 28 and the gear 34 is maintained, because the arm 26 is locked byy the engagement lever 66 as described before. If the gear 12 of the motor 10 is rotated in the forward direction, then the arm 54 is rotated in the clockwise direction to disengage the planetary gear 50 out of the gear 54, so that the planetary gear 50 is brought into engagement with the switching mechanism such gear 56 as shown in FIG. 7. While the zoom lever 86 is set in the tele-position as shown in FIG. 7, there is formed a train of gears 50→56→156→162. In this state, if the motor 10 is rotated in the forward direction, then the gear 162 is accordingly rotated in a tele-direction T, whereby the lens barrel 100 is moved to to the zoom side. Also, when the zoom lever 86 is set in the wide position as shown in FIG. 8, then there is formed a train of gears 50→64→56→156→162. In this state, if the motor 10 is rotated in the forward direction, then the gear 162 is rotated in the wide direction W, whereby the lens barrel 100 is moved to the wide side. And, after the focal length is adjusted, the shutter is released for exposure of the film.

After then, if the gear 12 of the motor 10 is again rotated in the reverse direction, then, as described before, the rotational forces of the motor 10 are transmitted via the gears 12 through 28 as well as the gears 34 through 44 to the sun gear 46, whereby the arm 48 is again rotated in the counter-clockwise direction to be brought into engagement with the gear 54 of the frame-by-frame feeding mechanism. In this state, if the motor 10 is rotated in the counter-clockwise direction by an amount of one frame, then the film (not shown) can be rewound by one frame by the fork portion 60 of the gear 58. Thereafter, the above photographing operations are performed repeatedly in the above-mentioned manner.

The focal length varying mechanisms illustrated in the first and second embodiment according to the invention can also apply to either a camera employing a zoom mechanism or a camera employing a tele-wide (2 focal ponts) mechanism.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
   a rotary drive source;
   a preliminary winding mechanism for previously drawing out a film from a patrone to roll said film round a spool;
   a frame-by-frame rewinding mechanism for rewinding said film frame by frame into said patrone;
   a focal length varying mechanism for advancing or retreating a photographing lens barrel to vary focal length;
   a second planetary clutch mechanism selectively connectable to said focal length varying mechanism or said frame-by-frame rewinding mechanism for transmitting the rotational forces of said rotary drive source to said focal length varying mechanism or said frame-by-frame rewinding mechanism in accordance with the direction of rotation of said rotary drive source;
   a first planetary clutch mechanism selectively connectable to said preliminary winding mechanism or said second planetary clutch mechanism for transmitting the rotational forces of said rotary drive source to said preliminary winding mechanism or to said second planetary clutch mechanism; and,
   an engagement mechanism for switching said first clutch mechanism into connection with the second planetary clutch mechanism to lock said first planetary clutch mechanism while maintaining said connection after completion of said film preliminary winding.

2. A camera as set forth in claim 1 including a lock removing mechanism operable cooperatively with the opening/closing operation of a back cover for removing said locking by said engagement mechanism when said back cover is opened.

3. A camera as set forth in claim 2, wherein said first planetary clutch mechanism comprises a sun gear in connection with said rotary drive source, a planetary gear intermeshable with said sun gear, and an arm journaled coaxially with said sun gear and journaling said planetary gear on the tip end thereof and wherein said planetary gear is connectable with said preliminary winding mechanism or said second planetary clutch mechanism.

4. A camera as set forth in claim 3, wherein said second planetary clutch mechanism comprises a sun gear in connection with said first planetary clutch mechanism, a planetary gear intermeshable with said sun gear, and an arm journaled coaxially with said sun gear and journaling said planetary gear on the tip end thereof, and wherein said planetary gear is connectable with said frame-by-frame rewinding mechanism or said focal length varying mechanism in accordance with the directon of rotation of said rotary drive source.

5. A camera as set forth in claim 4, wherein said engagement mechanism includes an engagement lever and said engagement lever is used to lock said arm in such a manner that said planetary gear of said first planetary clutch mechanism is engagement with said second planetary clutch mechanism.

6. A camera as set forth in claim 5, wherein said lock removing mechanism includes a removing lever and said removing lever is operable cooperatively with the opening/closing operation of said back cover to remove said locking by said engagement lever when said back cover is opened.

7. A camera as set forth in claim 6 including a mechanism for switching said focal length varying mechanism, said switching mechanism being connected with said focal length varying mechanism and having a switching operation member which can be operated externally so that said photographing lens barrel can be driven in the advancing or retreating direction thereof selectively.

* * * * *